(12) United States Patent
Krenn (10) Patent No.: US 10,694,012 B2
(45) Date of Patent: Jun. 23, 2020

(54) ADAPTER FOR A HOLDING DEVICE

(71) Applicant: SAM SPORT AND MARKETING AG, Scherzingen (CH)

(72) Inventor: Thomas Krenn, Perchtoldsdorf (AT)

(73) Assignee: SAM SPORT AND MARKETING AG, Scherzingen (CH)

( * ) Notice: Subject to any disclaimer, the term of this patent is extended or adjusted under 35 U.S.C. 154(b) by 0 days.

(21) Appl. No.: 16/061,916

(22) PCT Filed: Dec. 15, 2016

(86) PCT No.: PCT/EP2016/081296
§ 371 (c)(1),
(2) Date: Jun. 13, 2018

(87) PCT Pub. No.: WO2017/103011
PCT Pub. Date: Jun. 22, 2017

(65) Prior Publication Data
US 2018/0375979 A1 Dec. 27, 2018

(30) Foreign Application Priority Data

Dec. 17, 2015 (DE) .................. 10 2015 122 072

(51) Int. Cl.
*H04M 1/04* (2006.01)
*F16M 11/04* (2006.01)
(Continued)

(52) U.S. Cl.
CPC ............ *H04M 1/04* (2013.01); *F16M 11/041* (2013.01); *F16M 11/10* (2013.01);
(Continued)

(58) Field of Classification Search
CPC ............... H04B 1/3888; H04B 1/3877; H04B 2001/3861; H04B 1/3833; H04B 1/3827;
(Continued)

(56) References Cited

U.S. PATENT DOCUMENTS

2013/0181584 A1 7/2013 Whitten
2013/0318775 A1 12/2013 Peters
(Continued)

FOREIGN PATENT DOCUMENTS

WO 2013106849 A1 7/2013
WO 2014145748 A1 9/2014

OTHER PUBLICATIONS

International Search Report PCT/EP2016/081296 dated Apr. 13, 2017.
(Continued)

*Primary Examiner* — Jaime M Holliday
(74) *Attorney, Agent, or Firm* — Millen, White, Zelano & Branigan, PC; Ryan Pool (57) ABSTRACT

An adapter for releasably fastening a portable/compact unit or object to a holding device. The adapter comprises a base plate and two projections projecting away from one another in opposite directions and at a spacing from the base plate. The base plate has means for attaching the adapter to the unit or object or attached fixedly thereto or is configured in one piece with it. A guide disc is mounted on the base plate, is parallel to said base plate and can be rotated at least to a limited extent between at least one released position and at least one locked position. The guide disc has a middle opening, into which the two projections extend. The opening comprises two plug-in regions into which a holding device suitable for interaction with the adapter can be plugged in at least partially when the guide disc is situated in a released position.

26 Claims, 5 Drawing Sheets

(51) Int. Cl.
*F16M 11/10* (2006.01)
*H04M 1/02* (2006.01)
*H04B 1/3827* (2015.01)
*H04B 1/3888* (2015.01)
*H04B 1/3877* (2015.01)
*H04W 88/02* (2009.01)
*H04M 1/12* (2006.01)
*A45C 11/00* (2006.01)
*F16M 13/02* (2006.01)

(52) U.S. Cl.
CPC ........ *A45C 2011/002* (2013.01); *F16M 13/02* (2013.01); *H04B 1/3827* (2013.01); *H04B 1/3833* (2013.01); *H04B 1/3877* (2013.01); *H04B 1/3888* (2013.01); *H04B 2001/3861* (2013.01); *H04M 1/0202* (2013.01); *H04M 1/026* (2013.01); *H04M 1/0254* (2013.01); *H04M 1/0283* (2013.01); *H04M 1/12* (2013.01); *H04W 88/02* (2013.01)

(58) Field of Classification Search
CPC ...... H04M 1/04; H04M 1/0202; H04M 1/026; H04M 1/0283; H04M 1/0254; H04M 1/0252; H04M 1/12; H04W 88/02; F16M 11/041; F16M 11/10; F16M 13/02; A45C 2011/002
USPC .......................................... 455/575.1–575.8
See application file for complete search history.

(56) References Cited

U.S. PATENT DOCUMENTS

| | | |
|---|---|---|
| 2014/0312086 A1 | 10/2014 | Whitten et al. |
| 2015/0136933 A1* | 5/2015 | Merzon ................ G06F 1/1626 248/450 |
| 2015/0144755 A1 | 5/2015 | Chien |
| 2016/0028428 A1* | 1/2016 | Sturniolo ............. H04B 1/3888 455/575.8 |
| 2016/0297491 A1 | 10/2016 | Whitten et al. |

OTHER PUBLICATIONS

International Search Report for PCT/EP2016/081296 dated Apr. 13, 2017.

* cited by examiner

ADAPTER FOR A HOLDING DEVICE

This invention relates to an adapter according to the preamble of Claim 1. It is used for the detachable fastening to a holding device of any devices or objects that are movable, portable and can be held by hand, which holding device is attached to another object. Using the adapter, for example, small containers, cases, bags or housings, which are provided for storing or receiving additional objects, or electrical equipment or devices such as, for example, lamps, loudspeakers, cameras, music-playing devices, navigational devices, cell phones, smart phones, mobile computers, PDAs or else accessories for such devices, such as, for example, external storage batteries or battery units, can in this way be fastened to a holding device, which for its part is mounted on another movable or stationary object, for example on a piece of sports equipment, on a bicycle or other vehicle, on a carrying or holding system, such as, for example, a stand, or on a structure or on a fixture of a structure.

Such adapters are in this case known not only in the form of separate components, but also as integrated parts of an object, which is to be fastened to a holding device. Thus, for example, a housing for a hand-held electronic device in which an adapter is integrated, via which the housing can be mounted in a detachable manner to a holding device that is related and adapted especially only to this adapter, is known from WO 2013/106849 A1.

A system for detachable mounting of a hand-held electronic device to a surface is known from US 2015/0136933 A1, whereby, on the one hand, a mounting plate is fastened to the surface and, on the other hand, a base plate that is adapted to this mounting plate and that can be coupled thereto receives the electronic device.

Another device and another system for a detachable mounting of a portable electronic device on a surface is known from WO 2014/145748 A1. The electronic device can be, for example, a smart phone or a navigation system, which is to be detachably attached to a smooth surface of a motor vehicle or in a structure.

A system for mounting a hand-held electronic device, which comprises two components that interact with one another, of which a first component is designed as an adapter in a housing for an electronic device while the other component forms a holding device to which the housing can be fastened by means of the adapter, is also known from US 2013/0318775 A1. As an alternative, the adapter is also available independently of such a housing, whereby it then forms a universal adapter, which can be attached, for example glued, directly to hand-held electronic devices.

Such an adapter comprises a base plate and at least two projections that are connected in a stationary manner thereto or are integral therewith, where said projections extend some distance from the base plate with a free end area in each case.

In the above-mentioned systems, the fastening is carried out by a relative rotation of the adapter compared to the holding device that is specially matched to this adapter.

Other holding devices to which a device or an object can be fastened by a straight-line shifting movement are also known, however. In particular, for fastening action cameras, holding devices that have two lateral guide walls with upper holding bars, between which a slide-in adapter that is also matched specially thereto can be inserted and engaged, are known.

The object of this invention is to provide a structurally simple and easily handled adapter of the initially-mentioned type, which makes possible a secure fastening by a rotational movement that can be implemented quickly even on a holding device that is designed for a shifting movement.

This object is achieved according to the invention by an adapter with the features of Claim 1. Advantageous configurations and further developments of the invention follow from the dependent claims.

In the case of the approach according to the invention, it is essential that the two projections extend outward, away from one another in opposite directions, and that a guide disk that is parallel thereto is mounted on the base plate, which disk is mounted to rotate to a limited extent or is mounted to freely rotate without limitations between at least one released position and at least one locked position at least by a predetermined angle of in particular 90°, whereby the guide disk has a central through opening, which receives the two projections that extend outward and whereby the opening in the contour thereof comprises two plug-in areas that are opposite to one another at the center of the opening, into which areas two guide walls of a holding device that is suitable for interacting with the adapter can be at least partially plugged, when the guide disk is in a released position.

In this case, a suitable holding device is defined as such a holding device that matches the adapter with respect to the geometric dimensions thereof and that has two guide walls, which can be plugged into the two plug-in areas.

In this case, the main advantage lies in the fact that despite a movement that can be embodied by rotation, the adapter can also be fastened to those holding devices that are actually designed for a straight-line fastening of another adapter. Therefore, for the newly-proposed adapter, no special holding devices that are adapted to rotational movement are necessary any longer; rather, they can be used along with already existing slide-in holding devices. For users, this means a significant additional benefit in the use of such holding devices designed for pushing in, onto which devices now not only conventional slide-in adapters but, when the adapter according to the invention is used, devices or objects also can be fastened in a fundamentally different way, which considerably broadens the possible applications of the existing holding devices.

The adapter according to the invention is distinguished by a simple design and easy handling. It can be integrated either into a device or an object or else be designed as a separate device that can be attached or connected to any device or any object via fastening means that are provided. The adapter can thus be provided, for example, for an integral fastening with adhesive agents or for the design of a threaded connection with bores. Also, the adapter can be sewn in particular to textile materials or plastics. In all cases, it ensures fastening by a rotational movement that is simple and easy to implement and at the same time ensures secure and reliable holding of a device or object that is connected to a holding device by means of the adapter.

It is especially advantageous when each of the two projections extends with its free end into a partial area of one of the two plug-in areas of the opening of the guide disk, when the guide disk is in a locked position. Each projection can then engage over a holding area that projects onto one of the two guide walls of a holding device that is plugged into the adapter, so that the adapter is locked or fastened to the holding device. When the guide disk is rotated into a released position, however, the two projections in each case are situated at least to the point outside of the plug-in areas where the plugging-in of a holding device into the adapter or the removal of a plugged-in holding device from the adapter can be implemented.

An especially simple and nevertheless stable embodiment of the adapter can be achieved in that the guide disk is designed in a circular manner on its outside periphery, whereby its outside periphery is overlapped at least in sections by at least one bearing element that is fastened to the base plate and is preferably designed ring-shaped, in order in this way to embody the rotatable bearing arrangement of the guide disk on the base plate.

It is also especially advantageous when the two projections are connected to the base plate via a central base that runs into the opening of the guide disk, whereby the projections extend outward from the base in opposite directions. In this case, the central base forms an axis, on which the central opening and the guide disk are centered.

Advantageously, the two projections are designed in the form of flat bars, which run at a distance parallel to the base plate. In this way, an intermediate space is formed between the base plate and the projections, in which space a holding area can engage, which area laterally projects to a guide wall from a holding device that is plugged into the adapter.

According to an especially preferred embodiment of the invention, locking means that can secure the guide disk in a locking manner in the locked and released positions are present on the adapter. Advantageously, the locking means can comprise at least one elastically springy element that is arranged on the guide disk or the base plate, which engages in the locked positions in a notch that is recessed in the respective other part.

Preferably, the guide disk can be rotated in two released positions that are offset by 180° relative to one another as well as in two intervening locked positions, which then are each offset 90° to the released positions. As an alternative, more than two, in particular six, locked positions can also be provided, which positions are distributed at regular or irregular intervals over the turning range of the guide disk. For example, in the case of a total of two released positions and six uniformly-distributed locked positions, two positions that are adjacent to one another are offset by 45°.

According to another preferred embodiment of the invention, it is proposed to limit the two plug-in areas of the central opening of the guide disk radially outward by in each case a straight side wall, whereby these two side walls are then oriented parallel to one another and perpendicular to a radial direction of the guide disk.

Advantageously, the adapter is suitable for interacting with a holding device, which has a base plate with two straight guide walls that are spaced apart and oriented parallel to one another, which walls project perpendicularly to the base plate. In this case, at the free end of each guide wall that faces away from the base plate, in each case there is a holding bar, which projects laterally in the direction of the respective other guide bar. In this case, at least relative to their geometric size, the two plug-in areas in the opening of the guide disk are adapted to the holding device that is suitable for interaction in such a way that the two holding bars of the holding device that are directed to one another can be plugged into the two plug-in areas when the guide disk is in a released position, and the two plugged-in holding bars are at least partially overlapped by the two projections when the guide disk is in a locked position.

In addition, it is especially advantageous in this case when the two plug-in areas with their side walls that are parallel to one another are adapted, at least relative to the length and to the distance between the side walls, to a holding device that is suitable for interacting with the adapter, in such a way that the two guide walls of the holding device can be plugged in with the holding bars arranged thereon in a positive way with slight play into the two plug-in areas of the opening.

According to an especially preferred embodiment of the invention, on the outside, the adapter is integrated into the bottom of a housing or a can or into the bottom of a holding device that is provided for receiving a portable electronic device such as a smart phone or a navigational device. As an alternative, the base plate of the adapter can be provided with an adhesive pad and/or with openings, so that it can be fastened by a user to any objects.

The subject matter of this invention is also a combination of an adapter of the above-described type with a holding device of the above-described type, which is suitable for interacting with the adapter. For this purpose, the holding device comprises a base plate with two guide walls that are spaced apart and parallel to one another and that preferably project perpendicularly to the base plate and in each case on whose free ends—that face away from the base plate—a holding bar extends in the direction of the respective other guide bar.

BRIEF DESCRIPTION OF THE DRAWINGS

Additional advantages and features of the invention follow from the subsequent description and the embodiments that are depicted in the drawings. Here:

FIG. 4C: shows the bottom view of the depiction in FIG. 4B, FIG. 4D: shows the sectional view along the line of intersection A-A from FIG. 4C, FIG. 4E: shows the sectional view along the line of intersection A1-A1 from FIG. 4B, FIG. 5A: shows the side view of the housing with the adapter from FIG. 4B that is pushed onto the holding device, whereby the housing with the adapter is rotated into the locked position.

The adapter 1 that is depicted in the figures is designed as an integral part of the bottom 2 of a housing 3. As an alternative, it could also be designed as a separate component and then could be fastened to the underside of the bottom 2. The housing can be closed by a cover, not depicted here. As an alternative, the housing 3 could also be designed for receiving an electrical device, in particular a smart phone or a navigational device.

Figure 1:
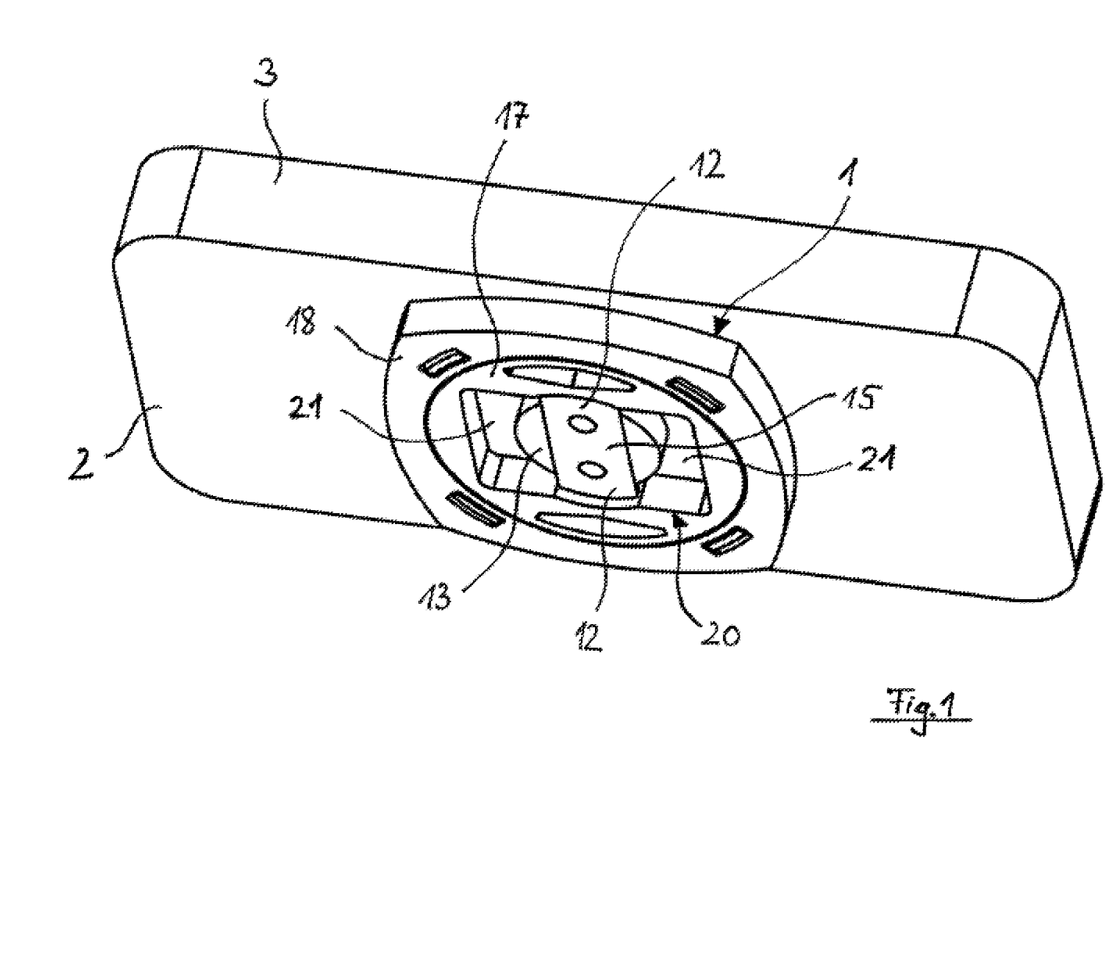
FIG. 1: shows a three-dimensional view of a variant embodiment of an adapter according to the invention on a housing.
Figure 2A:
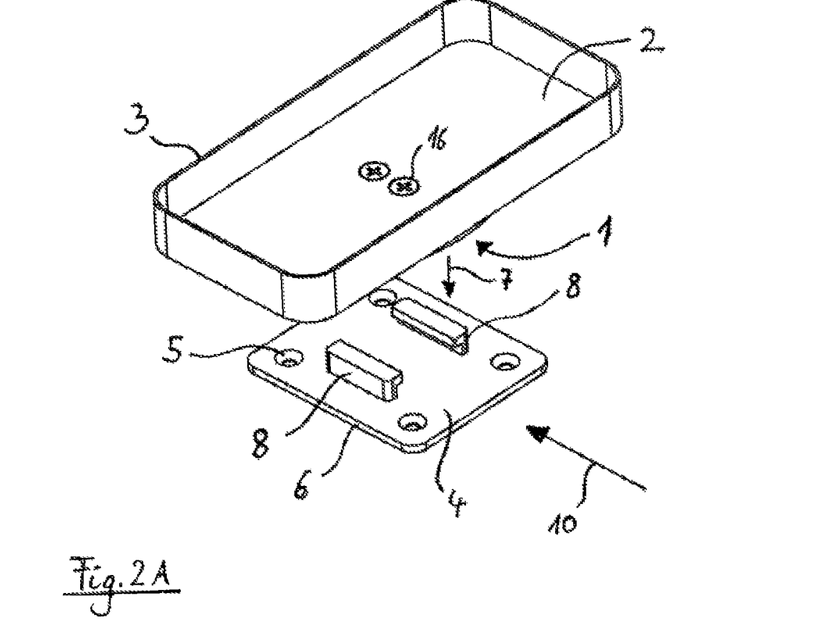
FIG. 2A: shows a three-dimensional view of the housing from FIG. 1 from above with a holding device, whereby the adapter is in its released position.
Figure 4A:
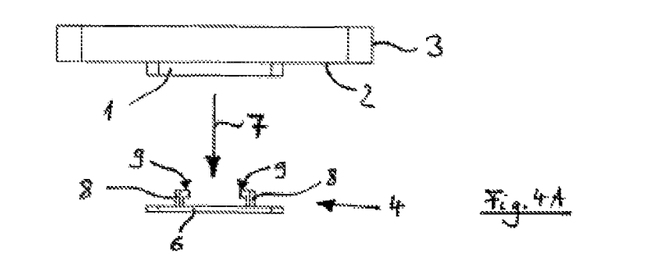
FIG. 4A: shows a side view of the housing and the holding device from FIG. 2A, FIG. 4B: shows a side view corresponding to FIG. 4A, in which the housing with the adapter is pushed onto the holding device.
Figure 4B:
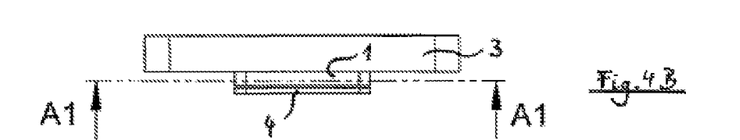
Figure 4C:
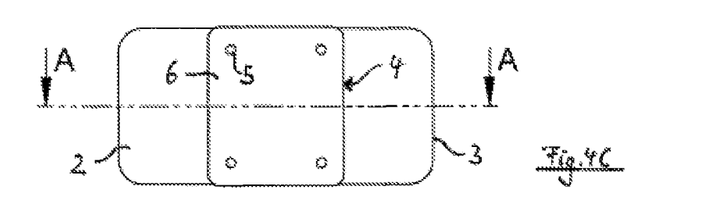

With the help of the adapter 1, the housing 3 can be detachably fastened to a holding device 4, which for its part can be fastened via bores 5 in its base plate 6 to another object. To this end, the adapter 1 in the direction of the arrow 7 (FIGS. 2A and 4A) from above has the two straight guide walls 8 that are spaced apart and oriented parallel to one another, which guide walls project upward on the base plate 6 of the holding device 4. On the upper end of each guide wall 8, a holding bar 9 projects in the direction of the respective other guide wall 8, so that the two holding bars 9 face one another detached from the base plate 6 and at a distance corresponding to the height of the guide walls 8. Thus, the holding device 4 is also suitable for receiving other adapters, not depicted here, which can be inserted in a straight line between the two guide walls 8 in the direction of the arrow 10 in FIG. 2A.

Figure 2B:
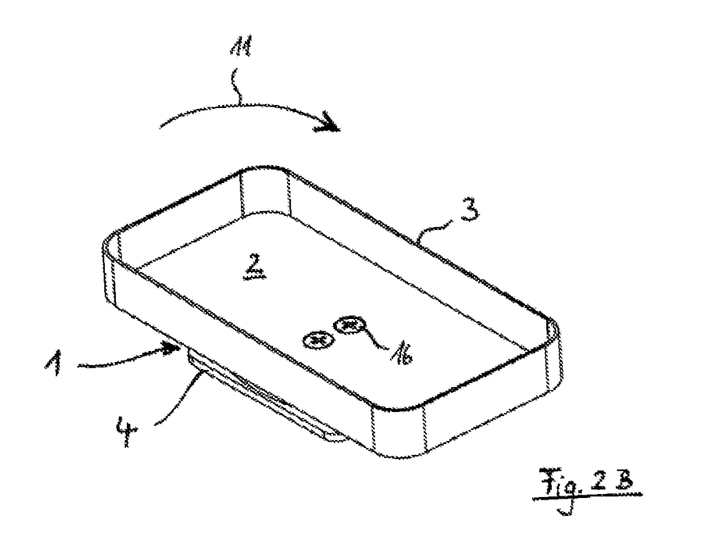
FIG. 2B: shows a view corresponding to FIG. 2A, whereby the housing is mounted on the holding device and is rotated with the adapter into its locked position.
Figure 3A:
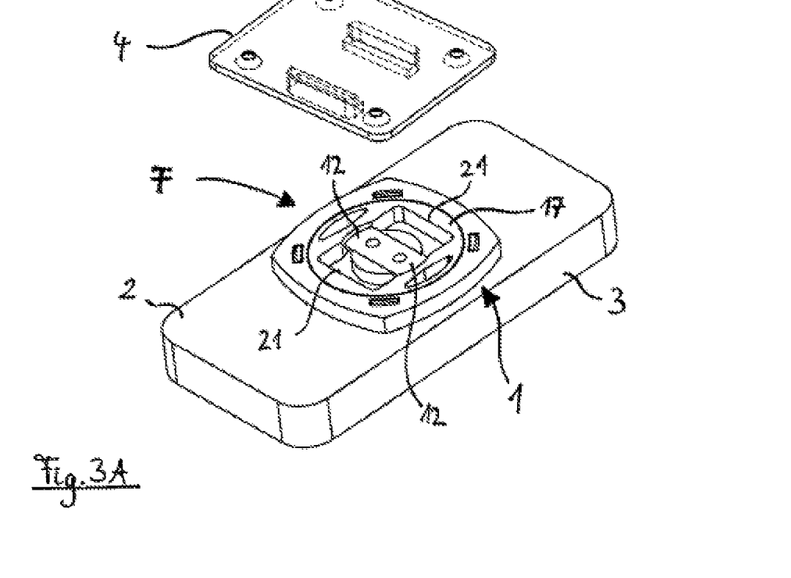
FIG. 3A: shows a three-dimensional view of the housing and the holding device from FIG. 2A from below, whereby the adapter is in its released position.
Figure 3B:
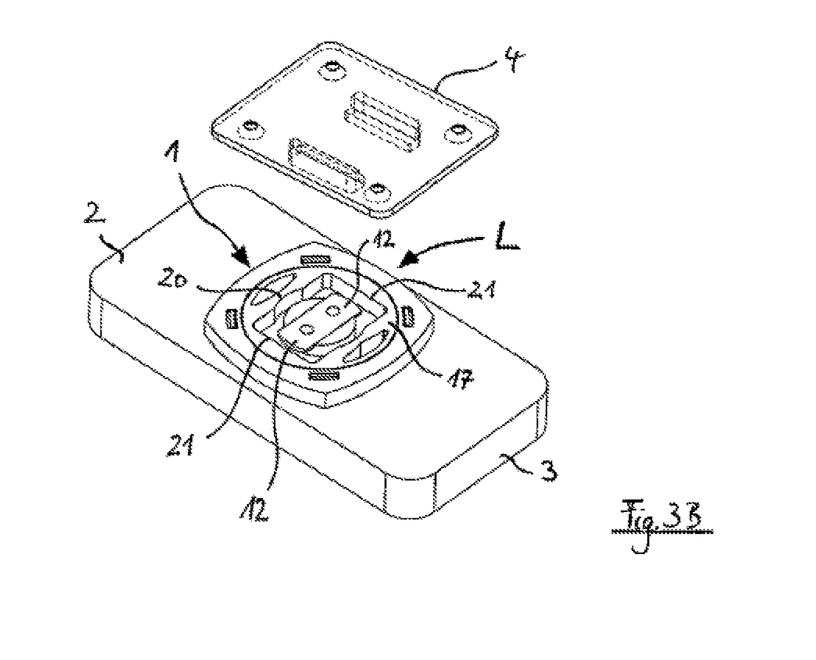
FIG. 3B: shows a three-dimensional view of the housing and the holding device from FIG. 3A, whereby the adapter is in its locked position.

After the mounting of the adapter 1 on the holding device 4, the adapter can be locked by a rotation of the housing 3 by 90°, so that a secure holding of the housing 3 on the holding device 4 is achieved. This rotational movement is depicted in FIG. 2b by the arrow 11. For removal, the housing 3 can be rotated again by 90° in the same direction or in the opposite direction and then can be pulled off upward from the holding device 4.

The adapter 1 comprises two projections 12 that extend outwardly away from one another starting from a central base 13. The base 13 connects the two projections 12 with a base plate 14 of the adapter 1, which, because of the integral design of the adapter 1 with the housing 3, is formed here by its bottom 2. The two projections are formed here by the two ends of a flat plate 15, which is fastened to the free axial end of the base 13 by two screws 16 or by rivets.

Parallel to the base plate 14, a circular guide disk 17 is mounted on the adapter 1 to rotate by 360° by virtue of the fact that it is encompassed on its periphery, which is designed in a stepped manner, by a ring-shaped bearing element 18 of the adapter 1. The bearing element 18 is fastened to a collar 19, which is molded-on projecting downward in a ring-shaped manner on the lower side of the bottom 2 or the base plate 14.

The guide disk 17 has a central through opening 20, which has a circular cross-sectional surface here. In the opening 20, the base 13 and the plate 15 with the two projections 12 are situated in the center. In the periphery of the opening 20, two essentially rectangular plug-in areas 21 are recessed opposite to one another, which areas broaden the surface of the opening 20 outward.

The guide disk 17 can be rotated between two released positions F (FIG. 4E) that are offset by 180° and two locked positions L (FIG. 5D) that in each case lie in-between. Elastically active locking means, not shown in more detail, hold the guide disk 17 in any released position F and in any locked position L in a tightly locked manner. Thus, an unintentional rotation of the guide disk 17 is safely prevented.

Figure 4D:
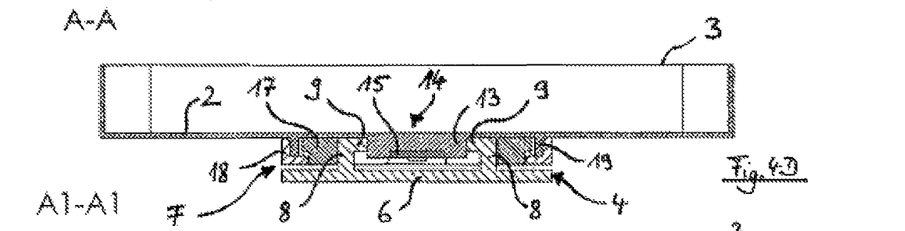
Figure 4E:
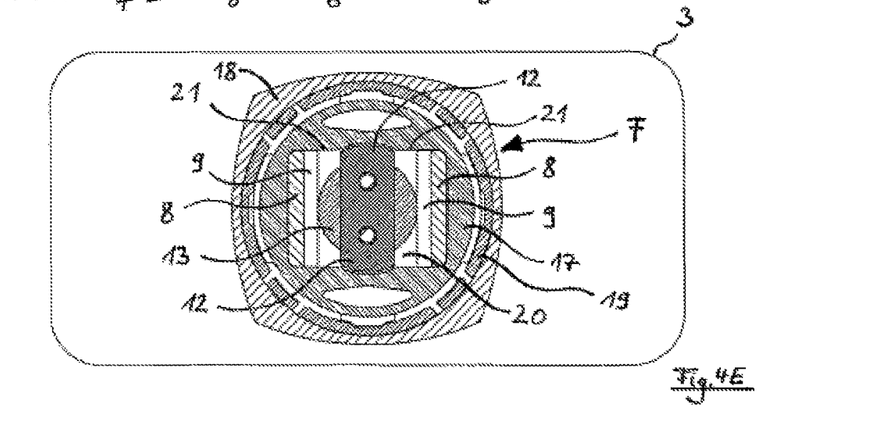

When the guide disk is in a released position F, the housing 3 with the adapter 1 can be pushed onto the holding device 4. In this case, the two plug-in areas 21 in each case receive a guide wall 8 with the holding bar 9 (FIGS. 4D and 4E).

Figures 5A, 5C:
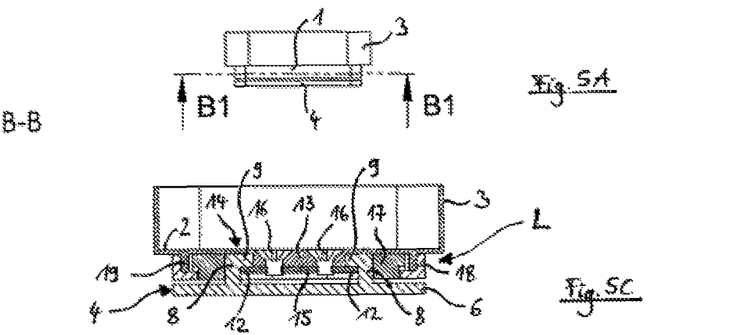
Figure 5B:
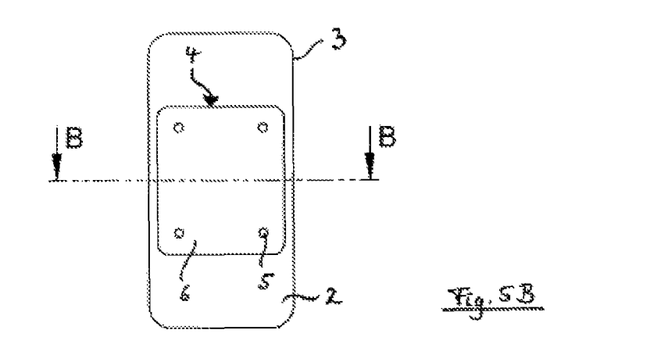
FIG. 5B: shows the bottom view of the depiction in FIG. 5A, FIG. 5C: shows the sectional view along the line of intersection B-B from FIG. 5B, FIG. 5D: shows a sectional view along the line of intersection B1-B1 from FIG. 5A.
Figure 5D:
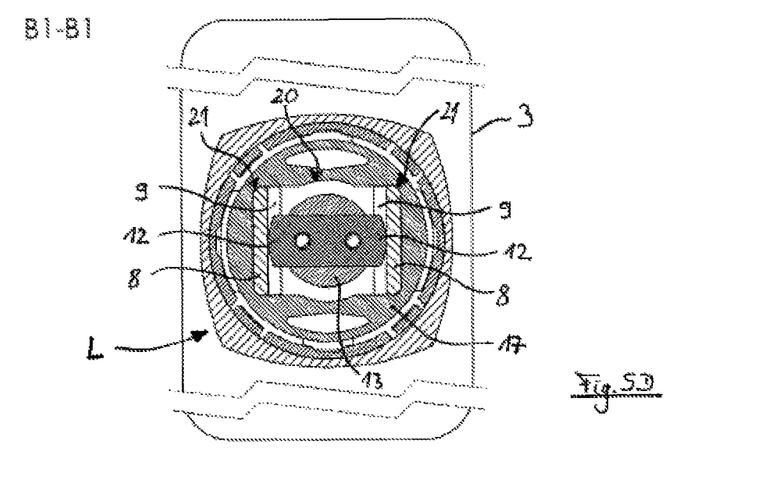

When the housing 3 with the adapter 1 that is pushed onto the holding device 4 is accordingly rotated by 90°, all elements that are tightly connected to the housing 3 and the adapter 1 rotate together. In this case, only the guide disk 17 is held in its position by the two guide walls 8 of the holding device 4, so that it is rotated by 90° into a locked position L relative to the other elements of the adapter 1. In the locked position L, the holding bars 9 of the holding device 4 that face one another are undercut by the two projections 12 in such a way that they are between the projections 12 and the bottom 2 of the housing 3 or the base plate 14 of the adapter 1 (FIGS. 5C and 5D). As a result, a removal of the adapter 1 from the holding device 4 is prevented, so that the housing 3 is held or fastened securely to the holding device 4.

The guide walls 8 with the holding bars 9, arranged thereon, of a holding device 4 that is suitable for interacting with the adapter 1 can also be plugged into the plug-in areas 21 of the opening 20 of the guide disk 17 only when the guide disk 17 is in a released position F. When the guide disk is in a locked position L, however, the holding bars 9 of the two guide walls 8 are in each case held between the base plate 14 of the adapter 1 and the projections 12, so that the holding device 4 cannot be removed from the adapter 1 and is locked thereto.

The invention claimed is:

1. An adapter (1), which is intended for detachable fastening of a portable and hand-held device or object to a holding device (4), whereby the adapter (1) comprises a base plate (14) and two projections (12) that are connected herewith or designed to be integral herewith, which projections project at a distance to the base plate (14), and whereby either the base plate (14) has means for attaching the adapter (1) to a portable and hand-held device or object (3) or whereby the base plate (14) is attached securely to a portable and hand-held object (3) or is thus designed in one piece, characterized in that:

the two projections (12) extend away from one another in opposite directions, and in that a guide disk (17) that is parallel thereto is mounted on the base plate (14), which disk can be rotated at least to a limited extent between at least one released position (F) and at least one locked position (L), whereby the guide disk (17) has a central opening (20), into which the two projections (12) extend, and whereby the opening (20) in the contour thereof comprises two plug-in areas (21), into which a holding device (4) that is suitable for interacting with the adapter (1) can be plugged at least partially, when the guide disk (17) is in a released position (F), wherein the adaptor is intended for detachable locking of a portable and hand-held device or object (3) to a holding device (4), which has a base plate (6) with two straight guide walls (8) that are oriented parallel to one another, which walls project perpendicularly to the base plate (6), and on whose free ends that face away from the base plate (6) in each case a holding bar (9) extends in the direction of the respective other guide wall (8), whereby in the contour of the opening (20) of the guide disk (17), the two plug-in areas (21) are adapted to the holding device (4) in such a way that the latter with its two holding bars (9) that face one another can be plugged into the two plug-in areas (21) when the guide disk (17) is in a released position (F), and whereby the two plugged-in holding bars (9) are at least partially overlapped by the two projections (12) when the guide disk (17) is in a locked position (L).

2. The adapter (1) according to claim 1, characterized in that the two projections (12) extend at least partially in respectively one part of a plug-in area (21) of the opening (20) of the guide disk (17) when the latter is in a locked position (L).

3. The adapter (1) according to claim 1, characterized in that the guide disk (17) is designed in a circular manner on its outside periphery, and in that for embodying the rotatable bearing arrangement thereof, its outside periphery is overlapped at least in sections by at least one bearing element (18) that is fastened to the base plate (14) and is designed in particular in a ring-shaped manner.

4. The adapter (1) according to claim 3, characterized in that the two projections (12) are connected via a central base (13) to the base plate (14), from which they extend outward in opposite directions, whereby the base (13) extends into the central opening (20) of the guide disk (17) and is centered on the guide disk (17).

5. The adapter (1) according to claim 1, characterized in that the two projections (12) are designed as flat bars, which run at a distance parallel to the base plate (14).

6. The adapter (1) according to claim 1, characterized in that it comprises locking means, by which the guide disk (17) can be secured in a locking manner in the at least one locked position (L) and in the at least one released position (F).

7. The adapter (1) according to claim 1, characterized in that the guide disk (17) can be rotated in two released positions (F) that are offset by 180° relative to one another, between which positions one locked position (L) or two each or three each locked positions (L) are provided that are distributed uniformly or irregularly at an angle.

8. The adapter (1) according to claim 1, characterized in that the two plug-in areas (21) of the central opening (20) of the guide disk (17) are limited outward in each case by a straight side wall, whereby the two side walls are oriented parallel to one another and perpendicular to a radial direction of the guide disk (17), and the two plug-in areas (21) with their side walls that are parallel to one another are adapted, at least relative to the length and to the distance between the side walls, to a holding device (4) that is suitable for interacting with the adapter (1), in such a way that their two guide walls (8) can be plugged in with the holding bars (9) arranged thereon in a positive way into the two plug-in areas (21) of the opening (20).

9. The adapter (1) according to claim 1, characterized in that it is integrated into the bottom (2) of a housing (3) or a can or into the bottom of a holding device that is provided for receiving a portable electronic device, in particular a mobile telephone or a navigational device.

10. The adapter (1) according to claim 1, further comprising a holding device (4) integrated therewith, which holding device (4) has a base plate (6) with two straight guide walls (8) that are spaced apart and oriented parallel to one another, which walls project onto the base plate (6), and on their ends that face away from the base plate (6), in each case a holding bar (9) extends in the direction of the respective other guide walls (8).

11. An adapter (1), which is intended for detachable fastening of a portable and hand-held device or object to a holding device (4), whereby the adapter (1) comprises a base plate (14) and two projections (12) that are connected herewith or designed to be integral herewith, which projections project at a distance to the base plate (14), and whereby either the base plate (14) has means for attaching the adapter (1) to a portable and hand-held device or object (3) or whereby the base plate (14) is attached securely to a portable and hand-held object (3) or is thus designed in one piece, characterized in that:
the two projections (12) extend away from one another in opposite directions,
and in that a guide disk (17) that is parallel thereto is mounted on the base plate (14), which disk can be rotated at least to a limited extent between at least one released position (F) and at least one locked position (L),
whereby the guide disk (17) has a central opening (20), into which the two projections (12) extend,
and whereby the opening (20) in the contour thereof comprises two plug-in areas (21), into which a holding device (4) that is suitable for interacting with the adapter (1) can be plugged at least partially, when the guide disk (17) is in a released position (F), and
the guide disk (17) can be rotated in two released positions (F) that are offset by 180° relative to one another, between which positions one locked position (L) or two each or three each locked positions (L) are provided that are distributed uniformly or irregularly at an angle.

12. The adapter (1) according to claim 11, characterized in that the two projections (12) extend at least partially in respectively one part of a plug-in area (21) of the opening (20) of the guide disk (17) when the latter is in a locked position (L).

13. The adapter (1) according to claim 11, characterized in that the guide disk (17) is designed in a circular manner on its outside periphery, and in that for embodying the rotatable bearing arrangement thereof, its outside periphery is overlapped at least in sections by at least one bearing element (18) that is fastened to the base plate (14) and is designed in particular in a ring-shaped manner.

14. The adapter (1) according to claim 13, characterized in that the two projections (12) are connected via a central base (13) to the base plate (14), from which they extend outward in opposite directions, whereby the base (13) extends into the central opening (20) of the guide disk (17) and is centered on the guide disk (17).

15. The adapter (1) according to claim 11, characterized in that the two projections (12) are designed as flat bars, which run at a distance parallel to the base plate (14).

16. The adapter (1) according to claim 11, characterized in that it comprises locking means, by which the guide disk (17) can be secured in a locking manner in the at least one locked position (L) and in the at least one released position (F).

17. The adapter (1) according to claim 11, characterized in that the two plug-in areas (21) of the central opening (20) of the guide disk (17) are limited outward in each case by a straight side wall, whereby the two side walls are oriented parallel to one another and perpendicular to a radial direction of the guide disk (17), and the two plug-in areas (21) with their side walls that are parallel to one another are adapted, at least relative to the length and to the distance between the side walls, to a holding device (4) that is suitable for interacting with the adapter (1), in such a way that their two guide walls (8) can be plugged in with the holding bars (9) arranged thereon in a positive way into the two plug-in areas (21) of the opening (20).

18. The adapter (1) according to claim 11,
characterized in that it is integrated into the bottom (2) of a housing (3) or a can or into the bottom of a holding device that is provided for receiving a portable electronic device, in particular a mobile telephone or a navigational device.

19. The adapter (1) according to claim 11, further comprising a holding device (4) integrated therewith, which holding device (4) has a base plate (6) with two straight guide walls (8) that are spaced apart and oriented parallel to one another, which walls project onto the base plate (6), and on their ends that face away from the base plate (6), in each case a holding bar (9) extends in the direction of the respective other guide walls (8).

20. An adapter (1), which is intended for detachable fastening of a portable and hand-held device or object to a holding device (4), whereby the adapter (1) comprises a base plate (14) and two projections (12) that are connected herewith or designed to be integral herewith, which projections project at a distance to the base plate (14),
and whereby either the base plate (14) has means for attaching the adapter (1) to a portable and hand-held device or object (3) or whereby the base plate (14) is attached securely to a portable and hand-held object (3) or is thus designed in one piece,
characterized in that:
the two projections (12) extend away from one another in opposite directions,
and in that a guide disk (17) that is parallel thereto is mounted on the base plate (14), which disk can be rotated at least to a limited extent between at least one released position (F) and at least one locked position (L),
whereby the guide disk (17) has a central opening (20), into which the two projections (12) extend,
whereby the opening (20) in the contour thereof comprises two plug-in areas (21), into which a holding device (4) that is suitable for interacting with the adapter (1) can be plugged at least partially, when the guide disk (17) is in a released position (F),
wherein the guide disk (17) is designed in a circular manner on its outside periphery, and in that for embodying the rotatable bearing arrangement thereof, its outside periphery is overlapped at least in sections by at least one bearing element (18) that is fastened to the base plate (14) and is designed in particular in a ring-shaped manner, and
wherein the two projections (12) are connected via a central base (13) to the base plate (14), from which they extend outward in opposite directions, whereby the base (13) extends into the central opening (20) of the guide disk (17) and is centered on the guide disk (17).

21. The adapter (1) according to claim 20,
characterized in that the two projections (12) extend at least partially in respectively one part of a plug-in area (21) of the opening (20) of the guide disk (17) when the latter is in a locked position (L).

22. The adapter (1) according to claim 20,
characterized in that the two projections (12) are designed as flat bars, which run at a distance parallel to the base plate (14).

23. The adapter (1) according to claim 20,
characterized in that it comprises locking means, by which the guide disk (17) can be secured in a locking manner in the at least one locked position (L) and in the at least one released position (F).

24. The adapter (1) according to claim 20,
characterized in that the two plug-in areas (21) of the central opening (20) of the guide disk (17) are limited outward in each case by a straight side wall, whereby the two side walls are oriented parallel to one another and perpendicular to a radial direction of the guide disk (17), and the two plug-in areas (21) with their side walls that are parallel to one another are adapted, at least relative to the length and to the distance between the side walls, to a holding device (4) that is suitable for interacting with the adapter (1), in such a way that their two guide walls (8) can be plugged in with the holding bars (9) arranged thereon in a positive way into the two plug-in areas (21) of the opening (20).

25. The adapter (1) according to claim 20,
characterized in that it is integrated into the bottom (2) of a housing (3) or a can or into the bottom of a holding device that is provided for receiving a portable electronic device, in particular a mobile telephone or a navigational device.

26. The adapter (1) according to claim 20, further comprising a holding device (4) integrated therewith, which holding device (4) has a base plate (6) with two straight guide walls (8) that are spaced apart and oriented parallel to one another, which walls project onto the base plate (6), and on their ends that face away from the base plate (6), in each case a holding bar (9) extends in the direction of the respective other guide walls (8).

* * * * *